Aug. 18, 1936.　　　　　O. OLSEN　　　　　2,051,223
PRISON GATE
Original Filed July 7, 1934　　3 Sheets-Sheet 3
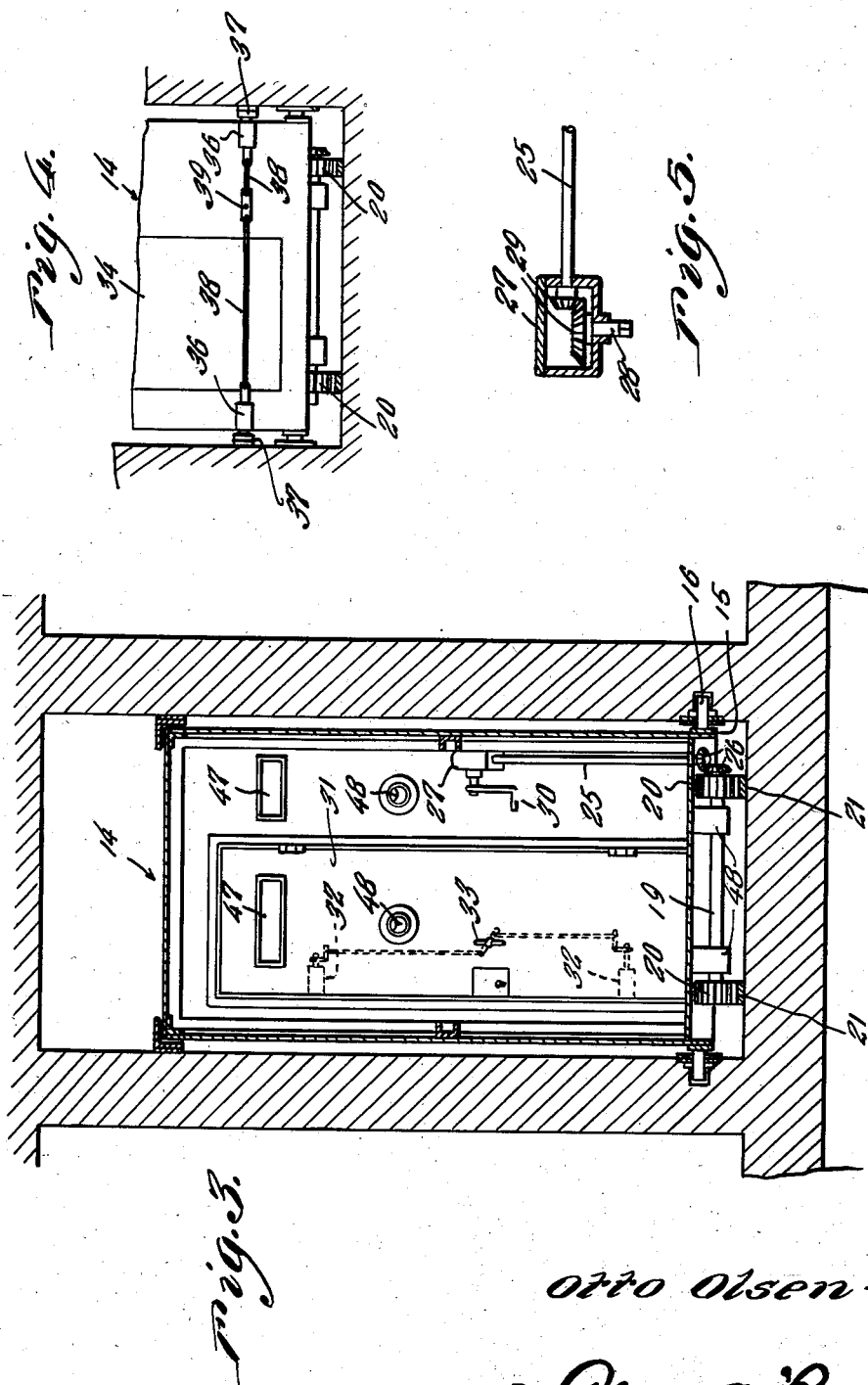
Inventor
Otto Olsen
By Clarence A. O'Brien
Attorney Patented Aug. 18, 1936

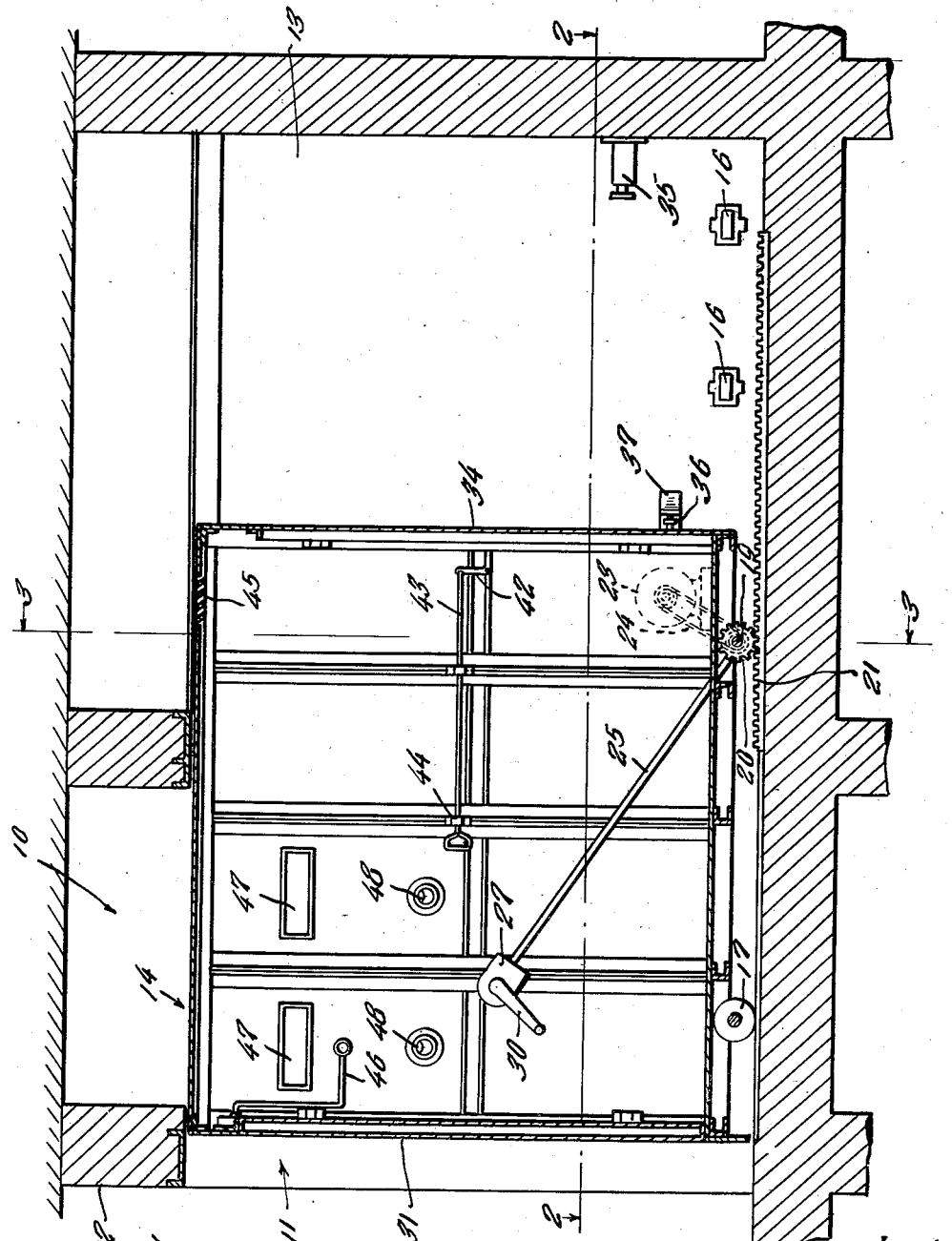

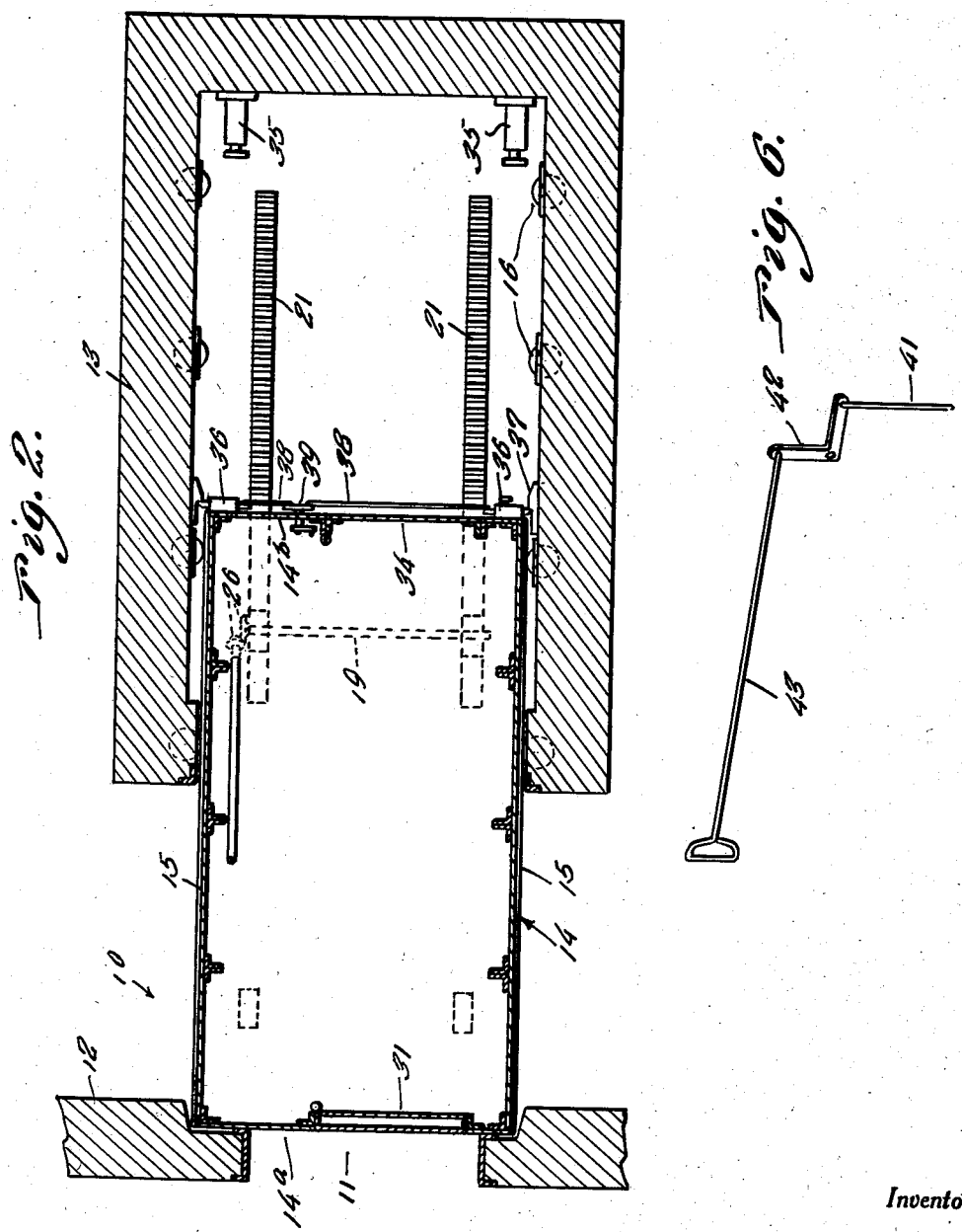

2,051,223

UNITED STATES PATENT OFFICE 2,051,223

PRISON GATE

Otto Olsen, Detroit, Mich.

Application July 7, 1934, Serial No. 734,185
Renewed July 3, 1935

7 Claims. (Cl. 189—7)

This invention relates to gates for prisons, and an object of the invention is to provide a gate which will prevent prison deliveries by overpowering of the gate keepers.

A further object of the invention is to provide a gate of such a construction as can withstand battering rams or the like forced thereagainst from either side of the gate.

A still further object of the invention is to provide a prison gate which will serve to house the keeper of the gate.

The invention together with its objects and advantages will be best understood from a study of the following description taken in connection with the accompanying drawings wherein:

Figure 1 is a vertical sectional view illustrating the invention with the gate in closed position.

Figures 2 and 3 are sectional views taken substantially in the lines 2—2 and 3—3 respectively of Figure 1.

Figure 4 is a detail elevational view showing the latch means for the gate.

Figure 5 is a detail sectional view through the gearing forming part of the manual means for moving the gate from closed to open position and vice versa.

Figure 6 is a perspective view of an operating rod and associated parts for the latch structure shown in Figure 4.

Referring to the drawings by reference numerals, let 10 indicate generally a passageway or corridor into which opens one or more entrances or exits 11 provided in a wall 12.

In accordance with the present invention there is located at the side of the corridor 10 opposite to the wall 12 and in substantial alinement with the opening 11 a structure 13 which may be termed a blind room and which accommodates the gate 14 when the latter is in open position.

The gate 14 is constructed of steel or other suitable material, and is of somewhat shell-like form being adapted to house therein the guard or keeper of the gate.

The side walls of the gate 14 are provided with tracks 15 that engage anti-friction rollers 16 suitably journaled in opposing side walls of the room 13.

Adjacent its forward end, that is, adjacent the end 14a thereof, the gate 14 is mounted on suitable rollers 17 while adjacent the rear end, that is the end 14b thereof, the gate has suitably journaled in bearings 18 depending from the floor or bottom thereof a transverse shaft 19 on the ends of which are cog wheels 20. The cog wheels 20 are in mesh with rack bars 21 laid on the floor of the room 13.

The shaft 19 may, if desired, be driven from a suitable electric motor 23 suitably arranged in the gate 14 and connected with the shaft 19 through belt and pulley or chain and sprocket means, or any other suitable power transmitting means 24.

Also, and as clearly shown in the drawings, the movement of the gate from open or closed position may be controlled directly and manually by the guard through the medium of a shaft 25 arranged within the gate and in driving engagement with the shaft 19 through the medium of bevel gearing 26. At its upper end the shaft 25 terminates within a gear case 27 suitably mounted internally and on one side wall of the gate 14, and within the gear case 27 the shaft 25 is in engagement with a suitably mounted stub shaft 28 through the medium of bevel gearing 29. On its outer end the stub shaft 28 is squared to accommodate an operating handle 30.

Entrance to the gate 14 is had at the end 14a thereof through the medium of a hollow hinge door 31 provided internally with upper and lower latches or locks 32 simultaneously controlled through a suitable handle 33 connected with the latch members in any suitable manner.

Access to and from the blind room 13 may be had through the gate 14 from the end 14b of the gate, which end, as clearly shown in the drawings, is provided with a suitable hinge door 34.

Bumpers 35 are provided on the inner end wall of the chamber or room 13.

For locking the gate 14 in its closed or projected position, which is the position shown in Figure 2, there are provided at the end 14b of the gate spring projected latch or locking devices 36 the bolts of which are engageable with keepers 37 suitably mounted on the side walls of the room 13 as also shown in Figure 2. The bolts of the latches 36 are connected for simultaneous operation through the medium of links 38 connected with a plate 39 on one end of a stub shaft journaled in the end wall 14b of the gate. The stub shaft supporting the plate 39 at its inner end is provided with a crank arm or in any other suitable manner for connection with one end of a link 41, that in turn is connected to one end of a suitably mounted bell crank 42. Connected to the other end of the bell crank 42 is an operating lever 43 that slides or operates in suitable guides 44 provided therefor internally of the gate.

For ventilating purposes there is provided in the top or roof of the gate adjacent the inner end thereof a ventilator 45, while for communication with those on the outside, there is provided for the convenience of the guard within the gate a suitable speaking tube 46.

In the side walls of the gate adjacent the top thereof are suitable windows 47. Also provided in the side walls of the gate are ports 48 for accommodating the barrels of guns or suitable fire arms.

From the above it will be apparent that when the gate is in the closed position, that is, with its forward end 14a in abutting engagement with the wall 12 the corridor 10 as well as the passageway or opening 11 are closed thereby. When the guard or keeper within the gate through the mechanism provided for that purpose causes the gate to be moved to an opening position, that is, into a position within the chamber 13 through passage through the corridors 10 and 11 may be had.

Having thus described the invention, what is claimed as new is:

1. In combination with a wall, a corridor at one side of the wall, and a passageway opening into the corridor through the wall, a blind room at the side of the corridor opposite to the wall and in alinement with the passageway, a hollow shell-like door movable outwardly of the blind room into a position across the corridor and into contact with the wall at said passageway for closing the latter and interrupting communication between the passageway and the corridor, said door being adapted to accommodate a guard and provided with entrance and exit doors.

2. In combination with a wall, a corridor at one side of the wall, and a passageway opening into the corridor through the wall, a blind room at the side of the corridor opposite to the wall and in alinement with the passageway, a hollow shell-like door movable outwardly of the blind room into a position across the corridor and into contact with the wall at said passageway for closing the latter and interrupting communication between the passageway and the corridor, said door being adapted to accommodate a guard and provided with entrance and exit doors, and means under the control of the occupant of the door for projecting and retracting the door relative to said blind room.

3. In combination with a wall, a corridor at one side of the wall, and a passageway opening into the corridor through the wall, a blind room at the side of the corridor opposite to the wall, and in alinement with the passageway, a hollow shell-like door movable outwardly of the blind room into a position across the corridor and into contact with the wall at said passageway for closing the latter and interrupting communication between the passageway and the corridor, said door being adapted to accommodate a guard and provided with entrance and exit doors, and means under the control of the occupant of the door for projecting and retracting the door relative to said blind room, said means including rack bars extending lengthwise of the blind room, rack wheels mounted on the door and in mesh with the rack bars, and driving means for the rack wheels.

4. In combination with a wall, a corridor at one side of the wall, and a passageway opening into the corridor through the wall, a blind room at the side of the corridor opposite to the wall, and in alinement with the passageway, a hollow shell-like door movable outwardly of the blind room into a position across the corridor and into contact with the wall at said passageway for closing the latter and interrupting communication between the passageway and the corridor, said door being adapted to accommodate a guard and provided with entrance and exit doors, and means under the control of the occupant of the door for projecting and retracting the door relative to said blind room, said means including rack bars extending lengthwise of the blind room, rack wheels mounted on the door and in mesh with the rack bars, and driving means for the rack wheels, latch devices on the inward end of the door, keeper devices on opposite walls of the blind room with which the latch devices are cooperable for releasably retaining the door in projected position, and means operable from within the door for releasing the latch devices.

5. In combination with a wall, a passageway through the wall, a blind room spaced from the wall and in alignment with the passageway, a hollow door movable outwardly of the blind room into position for closing the passageway, means internally of the blind room engageable with the door for releasably retaining the latter in projected position, and means operable from within the door for releasing the first mentioned means.

6. In combination with a wall having an opening therein, a hollow armored compartment member adapted to accommodate a guard, said compartment member being shaped to close said wall opening, means for projecting and retracting the compartment member relative to said wall opening, said means including a stationary rack bar, a rack wheel rotatably mounted on the compartment member and meshing with the rack bar and driving means for the rack wheel, said driving means being operable from within said compartment member, and manually operable means within the compartment member for locking the compartment member in the projected or retracted position.

7. In combination with a wall having an opening therein, a hollow armored compartment member adapted to accommodate a guard and means controllable from within said compartment member for projecting and retracting the door relative to the door opening, said compartment member being of a size and shape to form a closure for the wall opening, and manually operable means within the compartment member for locking the compartment member in the projected or retracted position.

OTTO OLSEN.